(12) United States Patent
Keshavan et al.

(10) Patent No.: US 8,499,861 B2
(45) Date of Patent: Aug. 6, 2013

(54) ULTRA-HARD COMPOSITE CONSTRUCTIONS COMPRISING HIGH-DENSITY DIAMOND SURFACE

(75) Inventors: Madapusi K. Keshavan, The Woodlands, TX (US); Anthony Griffo, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 369 days.

(21) Appl. No.: 11/857,334

(22) Filed: Sep. 18, 2007

(65) Prior Publication Data
US 2009/0071727 A1   Mar. 19, 2009

(51) Int. Cl.
*E21B 10/46* (2006.01)
(52) U.S. Cl.
USPC ............... 175/434; 175/405.1; 175/420.2; 51/307
(58) Field of Classification Search
USPC .................. 175/420.2, 405.1, 434
See application file for complete search history.

(56) References Cited

U.S. PATENT DOCUMENTS

| | | |
|---|---|---|
| 3,136,615 A | 6/1964 | Bovenkerk et al. |
| 3,141,746 A | 7/1964 | Lai |
| 3,233,988 A | 2/1966 | Wentorf, Jr. et al. |
| 3,745,623 A | 7/1973 | Wentorf, Jr. et al. |
| 4,108,614 A | 8/1978 | Mitchell |
| 4,151,686 A | 5/1979 | Lee et al. |
| 4,224,380 A | 9/1980 | Bovenkerk et al. |
| 4,255,165 A | 3/1981 | Dennis et al. |
| 4,268,276 A | 5/1981 | Bovenkerk |
| 4,288,248 A | 9/1981 | Bovenkerk et al. |
| 4,303,442 A | 12/1981 | Hara et al. |
| 4,311,490 A | 1/1982 | Bovenkerk et al. |
| 4,373,593 A | 2/1983 | Phaal et al. |
| 4,387,287 A | 6/1983 | Marazzi |
| 4,412,980 A | 11/1983 | Tsuji et al. |
| 4,481,016 A | 11/1984 | Campbell et al. |
| 4,486,286 A | 12/1984 | Lewin et al. |

(Continued)

FOREIGN PATENT DOCUMENTS

| | | |
|---|---|---|
| CA | 2506471 | 11/2005 |
| CA | 2556052 | 2/2007 |

(Continued)

OTHER PUBLICATIONS

Search Report for corresponding British Application No. GB 08 15944.4, dated Jan. 9, 2009, total 3 pages.

(Continued)

*Primary Examiner* — Brad Harcourt

(57) ABSTRACT

Ultra-hard composite constructions comprise an ultra-hard body having a plurality of diamond crystals bonded to one another by a carbide reaction product. A reactant material is selected from materials that are strong carbide formers to form a carbide reaction product with diamond at HPHT conditions. The body includes a high-density diamond region positioned along a surface portion of the body and that is substantially exclusively diamond, and that has a diamond volume content of 95 to 99 percent or more. The high-density diamond region can form a working surface of the composite construction. A substrate can be attached to the body, thereby forming a compact, and can include metallic materials, ceramic materials, carbides, nitrides, cermets, and mixtures thereof. An intermediate layer can be interposed between the body and the substrate depending on the substrate and/or method of attaching the same.

39 Claims, 4 Drawing Sheets

U.S. PATENT DOCUMENTS

| | | | |
|---|---|---|---|
| 4,504,519 A | 3/1985 | Zelez | |
| 4,522,633 A | 6/1985 | Dyer | |
| 4,525,179 A | 6/1985 | Gigl | |
| 4,534,773 A | 8/1985 | Phaal et al. | |
| 4,556,403 A | 12/1985 | Almond et al. | |
| 4,560,014 A | 12/1985 | Geczy | |
| 4,570,726 A | 2/1986 | Hall | |
| 4,572,722 A | 2/1986 | Dyer | |
| 4,604,106 A | 8/1986 | Hall | |
| 4,605,343 A | 8/1986 | Hibbs, Jr. et al. | |
| 4,606,738 A | 8/1986 | Hayden | |
| 4,621,031 A | 11/1986 | Scruggs | |
| 4,636,253 A | 1/1987 | Nakai et al. | |
| 4,645,977 A | 2/1987 | Kurokawa et al. | |
| 4,662,348 A | 5/1987 | Hall et al. | |
| 4,664,705 A | 5/1987 | Horton et al. | |
| 4,670,025 A | 6/1987 | Pipkin | |
| 4,707,384 A | 11/1987 | Schachner et al. | |
| 4,726,718 A | 2/1988 | Meskin et al. | |
| 4,766,040 A | 8/1988 | Hillert et al. | |
| 4,776,861 A | 10/1988 | Frushour | |
| 4,784,023 A | 11/1988 | Dennis | |
| 4,792,001 A | 12/1988 | Zijsling | |
| 4,793,828 A | 12/1988 | Burnand | |
| 4,797,241 A | 1/1989 | Peterson et al. | |
| 4,798,026 A | 1/1989 | Cerceau | |
| 4,802,539 A | 2/1989 | Hall et al. | |
| 4,807,402 A | 2/1989 | Rai | |
| 4,828,582 A | 5/1989 | Frushour | |
| 4,844,185 A | 7/1989 | Newton, Jr. et al. | |
| 4,861,350 A | 8/1989 | Phaal et al. | |
| 4,871,377 A | 10/1989 | Frushour | |
| 4,899,922 A | 2/1990 | Slutz et al. | |
| 4,919,220 A | 4/1990 | Fuller et al. | |
| 4,940,180 A | 7/1990 | Martell | |
| 4,943,488 A | 7/1990 | Sung et al. | |
| 4,944,772 A | 7/1990 | Cho | |
| 4,976,324 A | 12/1990 | Tibbitts | |
| 4,985,051 A | 1/1991 | Ringwood | |
| 5,011,514 A | 4/1991 | Cho et al. | |
| 5,027,912 A | 7/1991 | Juergens | |
| 5,030,276 A | 7/1991 | Sung et al. | |
| 5,032,147 A | 7/1991 | Frushour | |
| 5,037,704 A | 8/1991 | Nakai et al. | |
| 5,092,687 A | 3/1992 | Hall | |
| 5,116,568 A | 5/1992 | Sung et al. | |
| 5,127,923 A | 7/1992 | Bunting et al. | |
| 5,135,061 A | 8/1992 | Newton, Jr. | |
| 5,176,720 A | 1/1993 | Martell et al. | |
| 5,186,725 A | 2/1993 | Martell et al. | |
| 5,199,832 A | 4/1993 | Meskin et al. | |
| 5,205,684 A | 4/1993 | Meskin et al. | |
| 5,213,248 A | 5/1993 | Horton et al. | |
| 5,238,074 A | 8/1993 | Tibbitts et al. | |
| 5,264,283 A | 11/1993 | Waldenstrom et al. | |
| 5,337,844 A | 8/1994 | Tibbitts | |
| 5,370,195 A | 12/1994 | Keshavan et al. | |
| 5,379,853 A | 1/1995 | Lockwood et al. | |
| 5,439,492 A | 8/1995 | Anthony et al. | |
| 5,464,068 A | 11/1995 | Najafi-Sani | |
| 5,468,268 A | 11/1995 | Tank et al. | |
| 5,496,638 A | 3/1996 | Waldenstrom et al. | |
| 5,505,748 A | 4/1996 | Tank et al. | |
| 5,510,193 A | 4/1996 | Cerutti et al. | |
| 5,523,121 A | 6/1996 | Anthony et al. | |
| 5,524,719 A | 6/1996 | Dennis | |
| 5,560,716 A | 10/1996 | Tank et al. | |
| 5,607,024 A | 3/1997 | Keith et al. | |
| 5,620,382 A | 4/1997 | Cho et al. | |
| 5,624,068 A | 4/1997 | Waldenstrom et al. | |
| 5,645,617 A | 7/1997 | Frushour | |
| 5,667,028 A | 9/1997 | Truax et al. | |
| 5,718,948 A | 2/1998 | Ederyd et al. | |
| 5,722,499 A | 3/1998 | Nguyen et al. | |
| 5,769,176 A | 6/1998 | Sumiya et al. | |
| 5,776,615 A | 7/1998 | Wong et al. | |
| 5,833,021 A | 11/1998 | Mensa-Wilmot et al. | |
| 5,871,060 A * | 2/1999 | Jensen et al. | 175/420.2 |
| 5,897,942 A | 4/1999 | Karner et al. | |
| 5,954,147 A | 9/1999 | Overstreet et al. | |
| 5,979,578 A | 11/1999 | Packer | |
| 6,009,963 A | 1/2000 | Chaves et al. | |
| 6,063,333 A | 5/2000 | Dennis | |
| 6,123,612 A | 9/2000 | Goers | |
| 6,126,741 A | 10/2000 | Jones et al. | |
| 6,193,001 B1 | 2/2001 | Eyre et al. | |
| 6,234,261 B1 | 5/2001 | Evans et al. | |
| 6,248,447 B1 | 6/2001 | Griffin et al. | |
| 6,269,894 B1 | 8/2001 | Griffin | |
| 6,315,065 B1 | 11/2001 | Yong et al. | |
| 6,344,149 B1 | 2/2002 | Oles | |
| 6,410,085 B1 | 6/2002 | Griffin et al. | |
| 6,435,058 B1 | 8/2002 | Matthias et al. | |
| 6,443,248 B2 | 9/2002 | Yong et al. | |
| 6,544,308 B2 | 4/2003 | Griffin et al. | |
| 6,562,462 B2 | 5/2003 | Griffin et al. | |
| 6,592,985 B2 | 7/2003 | Griffin et al. | |
| 6,601,662 B2 | 8/2003 | Matthias et al. | |
| 6,951,578 B1 | 10/2005 | Belnap et al. | |
| 7,462,003 B2 | 12/2008 | Middlemiss | |
| 7,473,287 B2 | 1/2009 | Belnap | |
| 7,516,804 B2 | 4/2009 | Vail | |
| 7,543,662 B2 | 6/2009 | Belnap et al. | |
| 7,608,333 B2 | 10/2009 | Eyre | |
| 7,647,992 B2 | 1/2010 | Fang et al. | |
| 7,647,993 B2 | 1/2010 | Middlemiss | |
| 7,828,088 B2 | 11/2010 | Middlemiss et al. | |
| 7,980,334 B2 | 7/2011 | Voronin | |
| 2002/0023733 A1 | 2/2002 | Hall | |
| 2002/0034631 A1 | 3/2002 | Griffin | |
| 2002/0074168 A1 * | 6/2002 | Matthias et al. | 175/374 |
| 2002/0194955 A1 | 12/2002 | Fang et al. | |
| 2004/0076748 A1 | 4/2004 | Fries et al. | |
| 2005/0019114 A1 | 1/2005 | Sung | |
| 2005/0050801 A1 | 3/2005 | Cho et al. | |
| 2005/0129950 A1 | 6/2005 | Griffin et al. | |
| 2005/0139397 A1 | 6/2005 | Achilles et al. | |
| 2005/0230156 A1 | 10/2005 | Belnap et al. | |
| 2005/0263328 A1 | 12/2005 | Middlemiss | |
| 2006/0060392 A1 * | 3/2006 | Eyre | 175/434 |
| 2006/0165993 A1 | 7/2006 | Keshavan | |
| 2006/0191723 A1 * | 8/2006 | Keshavan | 175/374 |
| 2006/0217258 A1 | 9/2006 | Zhao | |
| 2006/0266559 A1 | 11/2006 | Keshavan et al. | |
| 2007/0029114 A1 | 2/2007 | Middlemiss | |
| 2007/0039762 A1 * | 2/2007 | Achilles | 175/434 |
| 2007/0079994 A1 * | 4/2007 | Middlemiss | 175/426 |
| 2007/0151769 A1 * | 7/2007 | Slutz et al. | 175/426 |
| 2007/0181348 A1 | 8/2007 | Lancaster et al. | |
| 2007/0187155 A1 | 8/2007 | Middlemiss | |
| 2008/0073126 A1 * | 3/2008 | Shen et al. | 175/434 |
| 2008/0230280 A1 | 9/2008 | Keshavan et al. | |
| 2008/0302579 A1 | 12/2008 | Keshavan et al. | |
| 2009/0090563 A1 | 4/2009 | Voronin | |
| 2009/0114454 A1 | 5/2009 | Belnap | |
| 2010/0115855 A1 | 5/2010 | Middlemiss | |
| 2011/0271603 A1 | 11/2011 | Voronin et al. | |

FOREIGN PATENT DOCUMENTS

| | | |
|---|---|---|
| CA | 2639727 | 4/2009 |
| EP | 0155066 B1 | 9/1985 |
| EP | 0196777 | 10/1986 |
| EP | 0297071 | 12/1988 |
| EP | 0300699 | 1/1989 |
| EP | 0329954 | 8/1989 |
| EP | 0352811 | 1/1990 |
| EP | 0374424 | 6/1990 |
| EP | 0500253 | 8/1992 |
| EP | 0585631 | 3/1994 |
| EP | 0595630 | 5/1994 |
| EP | 0612868 | 8/1994 |
| EP | 0617207 | 9/1994 |
| EP | 0787820 | 8/1997 |
| EP | 0860515 | 8/1998 |
| EP | 1116858 B1 | 7/2001 |
| EP | 1190791 | 3/2002 |
| EP | 1760165 | 3/2007 |

| | | |
|---|---|---|
| GB | 1349385 | 4/1974 |
| GB | 2048927 | 12/1980 |
| GB | 2261894 | 6/1993 |
| GB | 2268768 | 1/1994 |
| GB | 2270493 A | 3/1994 |
| GB | 2323398 | 9/1998 |
| GB | 2429471 A | 2/2007 |
| GB | 2 431 948 A | 5/2007 |
| GB | 2413813 | 11/2008 |
| GB | 2408735 | 1/2009 |
| GB | 2453023 | 3/2009 |
| GB | 2453435 | 4/2009 |
| JP | 59219500 A | 12/1984 |
| JP | S59219500 A | 12/1984 |
| JP | 8-176696 | 7/1996 |
| JP | 8225875 A | 9/1996 |
| RU | 2034937 | 5/1995 |
| RU | 566439 A | 7/2000 |
| SU | 990486 | 1/1983 |
| SU | 566439 | 1/2000 |
| WO | 9323204 | 11/1993 |
| WO | 9634131 | 10/1996 |
| WO | 0028106 | 5/2000 |
| WO | 2004040095 | 5/2004 |
| WO | 2004106003 | 12/2004 |
| WO | 2004106004 | 12/2004 |
| WO | 2007042920 | 4/2007 |

OTHER PUBLICATIONS

Translation of Japanese Unexamined Patent Application No. S59-218500. "Diamond Sintering and Processing Method," Shuji Yatsu and Tetsuo Nakai, inventors; Application published Dec. 10, 1984; Applicant: Sumitomo Electric Industries Co. Ltd. Office Action by USPTO mailed Mar. 11, 2003 for related U.S. Appl. No. 10/065,604.
Final Office Action dated Mar. 29, 2010 for related U.S. Appl. No. 12/329, 963, filed Dec. 8, 2008.
Web pages of elementsix entitled "What is CVD?", "What is CVD diamond?", and "What does CVD diamond look like?" (total 3 pages).
Web pages of P1 Diamond Inc. entitled "Affordable Industrial Diamond Manufacture" (total 2 pages).
Http://www.astro.virginia.edu/class/oconnell/astr121/im/periodic_table.gif "Periodic Table".
http://www.corrosionsource.com/handbook.periodic/periodic_tale.gif "Periodic Table of The elements".
Exam Report dated Dec. 20, 2007 for related GB application No. GB0426586.4 filed Dec. 3, 2004.
Search Report dated Mar. 17, 2005 for related GB application No. GB0426586.4 filed Dec. 3, 2004.
Response dated Jul. 23, 2008 to Exam Report dated Dec. 20, 2007 for related GB application No. GB0426586.4 filed Dec. 3, 2004.
Exam Report dated Jul. 16, 2008 for related GB application No. GB0426586.4 filed Dec. 3, 2004.
Response dated Nov. 24, 2008 to Exam Report dated Jul. 16, 2008 for related GB application No. GB0426586.4 filed Dec. 3, 2004.
Exam Report dated Dec. 2, 2008 for related GB application No. GB0426586.4 filed Dec. 3, 2004.
Response dated Dec. 11, 2008 to Exam Report dated Dec. 2, 2008for related GB application No. GB0426586.4 filed Dec. 3, 2004.
Restriction Requirement dated Aug. 21, 2006 for related U.S. Appl. No. 11/005,675, filed Dec. 6, 2004.
Response dated Sep. 20, 2006 to Restriction Requirement dated Aug. 21, 2006 for related U.S. Appl. No. 11/005,675, filed Dec. 6, 2004.
Non-Final Rejection dated Dec. 12, 2006 for related U.S. Appl. No. 11/005,675, filed Dec. 6, 2004.
Response dated Mar. 12, 2007 to Non-Final Rejection dated Dec. 12, 2006 for related U.S. Appl. No. 11/005,675, filed Dec. 6, 2004.
Final Office Action dated May 29, 2007 for related U.S. Appl. No. 11/005,675, filed Dec. 6, 2004.
Response dated Aug. 29, 2007 to Final Office Action dated May 29, 2007 for related U.S. Appl. No. 11/005,675, filed Dec. 6, 2004.
Advisory Action dated Sep. 17, 2007 for related U.S. Appl. No. 11/005,675, filed Dec. 6, 2004.
Response dated Oct. 1, 2007 to Advisory Action dated Sep. 17, 2007 for related U.S. Appl. No. 11/005,675, filed Dec. 6, 2004.
Non-final Office Action dated Dec. 7, 2007 for related U.S. Appl. No. 11/005,675, filed Dec. 6, 2004.
Response dated May 7, 2008 to Non-final Office Action dated Dec. 7, 2007 for related U.S. Appl. No. 11/005,675, filed Dec. 6, 2004.
Final Office Action dated Jun. 16, 2008 for related U.S. Appl. No. 11/005,675, filed Dec. 6, 2004.
Response dated Aug. 18, 2008 to Final Office Action dated Jun. 16, 2008 for related U.S. Appl. No. 11/005,675, filed Dec. 6, 2004.
Notice of Allowance dated Aug. 29, 2008 for related U.S. Appl. No. 11/005,675, filed Dec. 6, 2004.
Restriction Requirement dated Jul. 21, 2009 for related U.S. Appl. No. 12/347,450, filed Dec. 31, 2008.
Response dated Aug. 21, 2009 to Restriction Requirement dated Jul. 21, 2009 for related U.S. Appl. No. 12/347,450, filed Dec. 31, 2008.
Non-Final Office Action dated Dec. 9, 2009 for related U.S. Appl. No. 12/347,450, filed Dec. 31, 2008.
Response dated Mar. 9, 2010 to Non-Final Office Action dated Dec. 9, 2009 for related U.S. Appl. No. 12/347,450, filed Dec. 31, 2008.
Final Office Action dated Jun. 7, 2010 for related U.S. Appl. No. 12/347,450, filed Dec. 31, 2008.
Restriction Requirement dated Jun. 5, 2007 for related U.S. Appl. No. 11/122,541, filed May 4, 2005.
Response dated Jul. 5, 2007 to Restriction Requirement dated Jun. 5, 2007 for related U.S. Appl. No. 11/122,541, filed May 4, 2005.
Non-Final Office Action dated Sep. 19, 2007 for related U.S. Appl. No. 11/122,541, filed May 4, 2005.
Response dated Jan. 22, 2008 to Non-Final Office Action dated Sep. 19, 2007 for related U.S. Appl. No. 11/122,541, filed May 4, 2005.
Final Office Action dated May 16, 2008 for related U.S. Appl. No. 11/122,541, filed May 4, 2005.
Response dated Sep. 23, 2008 to Final Office Action dated May 16, 2008 for related U.S. Appl. No. 11/122,541, filed May 4, 2005.
Non-Final Office Action dated Dec. 5, 2008 for related U.S. Appl. No. 11/122,541, filed May 4, 2005.
Response dated Mar. 5, 2009 to Non-Final Office Action dated Dec. 5, 2008 for related U.S. Appl. No. 11/122,541, filed May 4, 2005.
Final Office Action dated May 21, 2009 for related U.S. Appl. No. 11/122,541, filed May 4, 2005.
Response dated Aug. 21, 2009 to Final Office Action dated May 21, 2009 for related U.S. Appl. No. 11/122,541, filed May 4, 2005.
Notice of Allowance dated Sep. 14, 2009 for related U.S. Appl. No. 11/122,541, filed May 4, 2005.
Search Report dated Jul. 19, 2005 for related application No. GB0509247.3 filed May 6, 2005.
Examination Report dated Jul. 23, 2007 for related application No. GB0509247.3 filed May 6, 2005.
Examination Report dated Dec. 4, 2007 for related application No. GB0509247.3 filed May 6, 2005.
Non-Final Office Action dated Dec. 2, 2009 for related U.S. Appl. No. 11/867,629, filed Oct. 4, 2007.
Response dated Apr. 20, 2010 to Non-Final Office Action dated Dec. 2, 2009 for related U.S. Appl. No. 11/867,629, filed Oct. 4, 2007.
Final OA dated Jun. 10, 2010 for related U.S. Appl. No. 11/867,629, filed Oct. 4, 2007.
Response dated Aug. 10, 2010 to Final OA dated Jun. 10, 2010 for related U.S. Appl. No. 11/867,629, filed Oct. 4, 2007.
Request for Continued Examination with Amendment dated Sep. 10, 2010 for for related U.S. Appl. No. 11/867,629, filed Oct. 4, 2007.
Search Report dated Dec. 1, 2008 for related application No. GB0818022.6 filed Oct. 2, 2008.
Non-Final Office Action dated Oct. 7, 2010 for related U.S. Appl. No. 11/867,629, filed Oct. 4, 2007.
Response dated Jan. 7, 2011 to Office Action dated Oct. 7, 2011 for related U.S. Appl. No. 11/867,629, filed Oct. 4, 2007.
Notice of Allowance dated Mar. 10, 2011 for related U.S. Appl. No. 11/867,629, filed Oct. 4, 2007.
EP Search report dated Nov. 2, 2010 for related EP application No. 06118267.1 filed Aug. 1, 2006.
Response dated Jun. 1, 2011 to EP Search report dated Nov. 2, 2010 for related EP application No. 06118267.1 filed Aug 1, 2006.

Canadian Examiner's Report dated Mar. 1, 2011 for related CA application No. 2489187 filed Dec. 3, 2004.

Canadian Examiner's Report dated Jun. 30, 2011 for related CA application No. 2506471 filed May 6, 2005.

Examination report dated May 26, 2011 for related GB application No. 0818022.6 filed Oct. 2, 2008.

Response dated Jul. 26, 2011 to Examination report dated May 26, 2011 for related GB application No. 0818022.6 filed Oct. 2, 2008.

Canadian Examiner's Report dated Jun. 1, 2011 for related CA application No. 2556052 filed Aug. 2, 2006.

Lide et al., "Periodic Table of Elements," CRC Handbook of Chemistry and Physics, 89th Edition, 2008-2009: p. 1.

Final Office Action dated Mar. 29, 2010 for related U.S. Appl. No. 12/329,963 filed Dec. 8, 2008.

Web pages of elementsix entitled "What is CVD?", "What is Cvd diamond?", and "What does CVD diamond look like?" (total 3 pages.) Jun. 15, 2005.

Web pages of P1 Diamond Inc. entitled "Affordable Industrial Diamond Manufacture" (total 2 pages.) Jun. 15, 2005.

Http://www.astro.virginia.edu/class/oconnell/astr121/im/periodictable.gif "Periodic Table" Jun. 23, 2009.

http://www.corrosionsource.com/handbook.periodic/periodic_tale.gif "Periodic Table of The elements" Jun. 23, 2009.

* cited by examiner

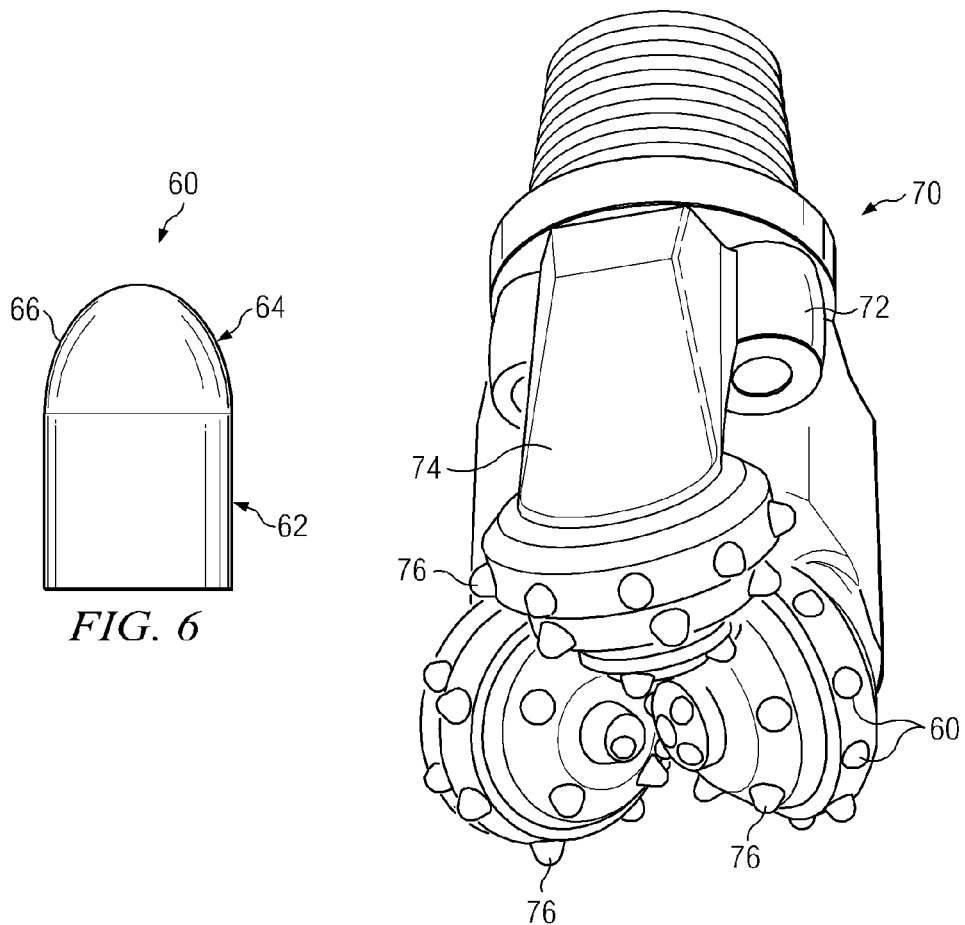
FIG. 6
FIG. 7
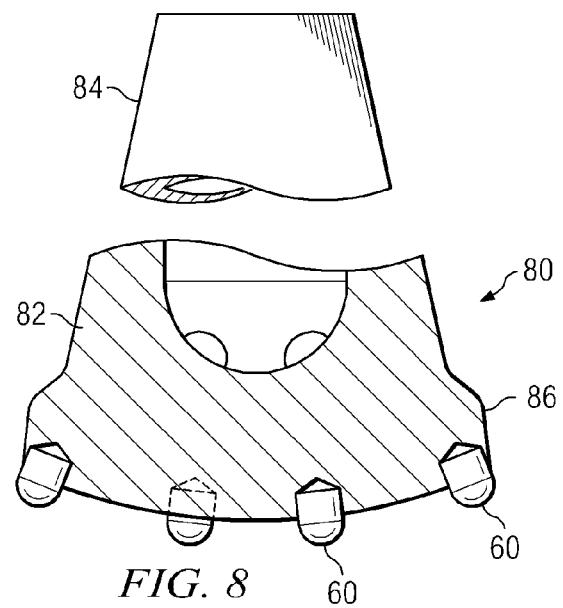
FIG. 8

ULTRA-HARD COMPOSITE CONSTRUCTIONS COMPRISING HIGH-DENSITY DIAMOND SURFACE

FIELD OF THE INVENTION

This invention generally relates to ultra-hard composite constructions and, more specifically, to ultra-hard composite constructions comprising a high-density diamond surface, methods for forming the same, and cutting elements formed therefrom, that are specially designed to provide improved thermal and/or mechanical properties when compared to conventional polycrystalline diamond constructions.

BACKGROUND OF THE INVENTION

Ultra-hard materials such as polycrystalline diamond (PCD) materials and PCD elements formed therefrom are well known in the art. Conventional PCD is formed by subjecting diamond grains, in the presence of a suitable solvent catalyst material, to extremely high pressure/high temperature (HPHT) conditions to promote formation of intercrystalline diamond-to-diamond bonding between the grains, thereby forming a PCD structure. The resulting PCD structure has enhanced properties of wear resistance and hardness, making PCD materials extremely useful in aggressive wear and cutting applications where high levels of wear resistance and hardness are desired.

Solvent catalyst materials typically used for forming conventional PCD include solvent metals from Group VIII of the Periodic table, with cobalt (Co) being the most common. Conventional PCD can comprise from 85 to 95% by volume diamond and a remaining amount of the solvent metal catalyst material. The solvent catalyst material is present in the microstructure of the PCD material, in interstitial regions that exist between the bonded together diamond grains.

A problem known to exist with such conventional PCD materials is thermal degradation due to differential thermal expansion characteristics that exist between the interstitial solvent catalyst material and the intercrystalline bonded diamond. Such differential thermal expansion is known to occur at temperatures of about 400° C., causing ruptures to occur in the diamond-to-diamond bonding, and resulting in the formation of cracks and chips in the PCD structure.

Another problem known to exist with conventional PCD materials is also related to the presence of the solvent catalyst material in the interstitial regions and the adherence of the solvent catalyst to the diamond crystals, and is known to cause another form of thermal degradation. Specifically, the solvent catalyst material causes an undesired catalyzed phase transformation to occur in diamond (converting it to carbon monoxide, carbon dioxide, or graphite) with increasing temperature, thereby limiting practical use of such conventional PCD material to about 750° C.

Attempts at addressing such unwanted forms of thermal degradation in PCD are known in the art. Generally, these attempts have involved modifying the PCD body in such a manner as to provide an improved degree of thermal stability at the wear or cutting surface of the body when compared to the conventional PCD material discussed above. One known attempt at producing a thermally stable PCD body involves removing the solvent catalyst material from a region of or from the entire PCD body.

This method, which is fairly time consuming, produces a diamond body that may be substantially free of the solvent catalyst material, and is therefore promoted as providing a diamond body having improved thermal stability. However, the resulting thermally stable diamond body can be somewhat brittle and not well suited for certain aggressive wear and/or cutting applications due to the absence of the relatively ductile solvent catalyst material, and/or due to the voids now left in the interstitial regions between the bonded together diamond grains or crystals.

Additionally, in the event that the solvent catalyst material is removed from the entire diamond body, such thermally stable diamond body has a coefficient of thermal expansion that is sufficiently different from that of conventional substrate materials (such as WC—Co and the like), and displays poor wetability to such conventional substrate materials to promote attachment thereto, making it difficult to form a desired attachment with such substrate materials to promote attachment with a desired wear and/or cutting device. This oftentimes results in the diamond body having to be attached or mounted directly to the end-use wear or cutting device, which may be time consuming, and/or not promote a desired strength attachment mechanism, and/or not facilitate positioning of the diamond body on the device in a manner to effect to most effective wear and/or cutting operation of the diamond body.

Another approach that has been used to improve the thermal stability of PCD is to remove the solvent catalyst material from a region of the PCD body near a working surface and then replace the removed solvent catalyst material with a diamond material by the process of chemical or plasma vapor deposition (CVD or PVD). Deposition of diamond by CVD or PVD process is one that results in the infiltration of diamond crystals into the voids or pores created from the removal of the solvent metal catalyst, that produces a PCD construction having a high-density diamond surface. Because the surface portion of the PCD construction is formed from diamond and does not include the catalyst solvent material, it is relatively more thermally stable than the surface of a conventional PCD construction. However, because this PCD construction still includes a region of PCD disposed below the diamond surface, it is still susceptible to the thermal degradation mechanisms noted above for conventional PCD.

It is, therefore, desired that an ultra-hard composite construction be developed in a manner that displays improved thermal and/or mechanical properties when compared to conventional PCD constructions and/or past attempts to make PCD constructions relatively more thermally stable. It is also desired that such ultra-hard composite constructions be capable of accommodating attachment with a suitable substrate to facilitate attachment of the resulting construction to an end-use application device by conventional method such as welding or brazing and the like. It is further desired that such ultra-hard composite constructions and compacts formed therefrom display properties of hardness/toughness and impact strength that are comparable or superior to those conventional thermally stable PCD material described above, and PCD compacts formed therefrom.

SUMMARY OF THE INVENTION

Ultra-hard composite constructions of this invention comprise an ultra-hard body having a plurality of diamond crystals. A majority of the diamond crystals are bonded to one another via a reaction product that is interposed therebetween, wherein the reaction product is formed by reaction of the diamond crystals with a reactant material, e.g., at HPHT conditions. In an example embodiment, greater than about 75 percent by volume of the diamond crystals are bonded to one another by the reaction product, and more preferably about 85 percent by volume of the diamond crystals are bonded to one another by the reaction product.

In an example embodiment, the reactant material is selected from the group of materials that are strong carbide formers that form a carbide reaction product when reacted with diamond. The reactant material can be selected from the group of materials that form a reaction products having a coefficient of thermal expansion that is closer to diamond than that of a catalyst material selected from Group VIII elements of the Periodic table. It is desired that the ultra-hard body be substantially free of a solvent metal catalyst material selected from the Group VIII elements of the Periodic table.

The ultra-hard body further comprises a high-density diamond region that is positioned onto at least a portion of the ultra-hard body surface, wherein the high-density diamond region comprises substantially exclusively diamond and can have a diamond volume content of from about 95 to 99 percent, and in certain examples can be 99 percent or more. The high-density diamond region can form at least a portion of a working surface of the composite construction. In an example embodiment, the high-density diamond region is substantially free of the reaction product. Additionally, the high-density region is substantially free of a Group VIII material of the Period table. The high-density diamond region can have a thickness of about 20 micrometers or less. The high-density diamond region can extend along all or a part of the ultra-hard body top and/or sidewall surface. The thickness of the high-density diamond region in the construction can be the same or can vary as a function of position on the underlying body.

The composite construction can further include a substrate attached to the ultra-hard body, thereby forming a compact. The substrate comprises a material selected from the group consisting of metallic materials, ceramic materials, carbides, nitrides, cermets, and mixtures thereof An intermediate layer can be interposed between the ultra-hard body and the substrate depending on the type of material forming the substrate and/or method of attaching the same.

Ultra-hard composite constructions of this invention have improved thermal and/or mechanical properties when compared to conventional PCD constructions. Ultra-hard composite constructions of the inventions having a substrate facilitate attachment of the resulting construction with an end-use application device. Ultra-hard composite constructions and compacts formed therefrom display properties of hardness/toughness and impact strength that are comparable or superior to those conventional thermally stable PCD material described above, and PCD compacts formed therefrom.

BRIEF DESCRIPTION OF THE DRAWINGS

These and other features and advantages of the present invention will be appreciated as the same becomes better understood by reference to the following detailed description when considered in connection with the accompanying drawings wherein:

FIG. 6 is a perspective side view of an insert, for use in a roller cone or a hammer drill bit, comprising the ultra-hard composite constructions of this invention;

FIG. 7 is a perspective side view of a roller cone drill bit comprising a number of the inserts of FIG. 6;

FIG. 8 is a perspective side view of a percussion or hammer bit comprising a number of inserts of FIG. 6;

DETAILED DESCRIPTION

Ultra-hard composite constructions, and compacts formed therefrom, of this invention are specifically engineered having composite construction comprising a thermally stable ultra-hard body having a high-density diamond region attached thereto that forms at least a portion of the surface of the construction. In an example embodiment, the ultra-hard body is formed from diamond grains that are bonded to one another by a reaction product between the diamond grains and a reactant material. The so-formed diamond body has a level of thermal stability that is superior to conventional PCD that comprises bonded-together diamond grains and a solvent metal catalyst material disposed in interstitial regions between the bonded-together diamond grains. In an example embodiment, the high-density diamond region comprises single, multi, or poly-crystalline diamond material that is disposed onto a surface of the ultra-hard body by appropriate technique to provide an improved degree of wear resistance and thermal stability thereto when compared to conventional PCD materials and thermally stable diamond materials formed by simply removing the solvent metal catalyst material from the interstitial regions of the PCD materials.

As used herein, the term "PCD" is used to refer to polycrystalline diamond that has been formed, at high pressure/high temperature (HPHT) conditions, through the use of a solvent metal catalyst, such as those metals included in Group VIII of the Periodic table. The ultra-hard body used in composite constructions of this invention, in the event that the ultra-hard material used to form the same is diamond grains or diamond crystals, is not referred to as PCD because, unlike conventional PCD and thermally stable PCD, it is not formed by the use of and/or subsequent removal of a solvent metal catalyst. Further, in the event that the ultra-hard body of this invention is formed using diamond grains, the resulting body comprises a microstructure characterized in diamond grains or crystals that are dispersed in a matrix of a reactant material, wherein a majority of the diamond grains or crystals are not directly bonded to one another. As noted above, ultra-hard composite constructions of this invention comprise an ultra-hard body that can be formed from materials including diamond, cBN, and combinations thereof. In an example embodiment, the ultra-hard material used to form the body is diamond.

Figure 1:
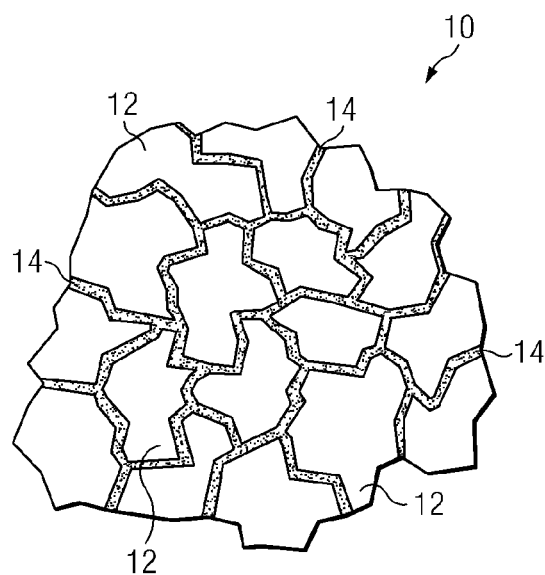
FIG. 1 is a schematic view of a section taken from an ultra-hard body formed from diamond grains according to principles of the invention.

FIG. 1 illustrates a region or section 10 of an example ultra-hard body of an ultra-hard composite construction of this invention having a material microstructure comprising a plurality of diamond grains or crystals 12 that are bonded to one another via a reaction product 14 formed between the diamond grains and a selected reactant material. While there may be some direct diamond-to-diamond bonding, a majority of the diamond grains within the ultra-hard body are bonded to other diamond grains via the reaction product interposed therebetween. In an example embodiment greater than about 75 percent of the diamond grains within the ultra-hard body are bonded to one another via the reaction product. Accordingly, the material microstructure of such ultra-hard body 10 comprises a distribution of both intercrystalline bonded diamond, and diamond grains that are bonded together by reaction with the preselected reactant material. Ideally, this distribution is homogeneous, but can also be somewhat localized depending on the manufacturing technique and process conditions.

Diamond grains useful for forming ultra-hard composite constructions of this invention include synthetic diamond powders having an average diameter grain size in the range of from submicrometer in size to 100 micrometers, and more preferably in the range of from about 1 to 80 micrometers. The diamond powder can contain grains having a mono or multi-modal size distribution. In an example embodiment, the diamond powder has an average particle grain sized of approximately 20 micrometers. In the event that diamond powders are used having differently sized grains, the diamond grains are mixed together by conventional process, such as by ball or attrittor milling for as much time as necessary to ensure good uniform distribution. The diamond grain powder is preferably cleaned, to enhance the sinterability of the powder by treatment at high temperature, in a vacuum or reducing atmosphere.

The diamond powder mixture is loaded into a desired container for placement within a suitable HPHT consolidation and sintering device. The reactant material can be introduced with the diamond powder according to a number of methods. In a first method, the reactant material can simply be added with the diamond powder before placement in the container for HPHT processing. In such method, the reactant material can be provided in the form of a powder mixture that is mixed together with the diamond powder before placement in the container. Alternatively, the reactant material can be added to the diamond powder in the form of a coating, where the diamond grains are coated with the reactant material. The diamond grains can be coated by techniques suitable for providing a desired coating thickness of the reactant material. Additionally, it is desired that such coating technique be capable of controlling the coating thickness so that the reactant material it is uniformly disposed onto the diamond grain. Suitable coating techniques include milling, atomic level deposition, plasma vapor deposition, and other techniques capable of providing a nanometer scale coating thickness of the reactant material onto the diamond grains.

In the case where the reactant material is combined, by powder mixing and/or coating, with the diamond grains prior to loading in the container for HPHT processing, it is desired that the amount of the reactant material provide be in an amount sufficient to provide the desired amount of reactant and related diamond bonding thereto with the ultra-hard body. In an example embodiment, the amount of reactant provided should be such that the ultra-hard body resulting from the HPHT process comprise in the range of from about 40 to 90 percent by volume diamond. In a preferred embodiment, an ultra-hard body formed from diamond as the ultra-hard material has in the range of from about 75 to 85 percent by volume diamond.

Another method that can be used to introduce the reactant material into the diamond mixture is one that takes place during the HPHT process. For example, rather than mixing the reactant material with the diamond powder before loading the mixture into the container for HPHT processing, the reactant material can be added in the form of a preformed layer or the like that is disposed adjacent the diamond powder. The preformed layer can be provided in the form of a film layer, foil layer or the like having a thickness sufficient to introduce a desired amount of the reactant material into the diamond powder during the HPHT process, e.g., when the HPHT process is operated at an elevated temperature at or above the melting temperature of the reactant material. During this process, the reactant initially provided in the form of a distinct layer melts and infiltrates into the diamond mixture to provide the desired reaction product during HPHT processing.

A still other method that can be used to introduce the reactant material into the diamond mixture or powder also takes place during the HPHT process. In this example, rather than being provided in the form of a preformed layer, e.g., in the form of a film, foil or the like of the reactant material positioned adjacent the diamond powder, the reactant material can be provided via a substrate that is positioned adjacent diamond powder mixture. In this example, the substrate can be formed from a material useful for forming an ultra-hard composite construction compact, to facilitate attachment of the compact to a desired wear and/or cutting device. Alternatively, the substrate can be sacrificial in the sense that it is only used for the purpose of providing a source of the reactant material during HPHT processing, and is subsequently removed from the ultra-hard body and not used to form a compact. In either case, the substrate that is used for the purpose of introducing the reactant material is one that includes and is capable of providing via infiltration a sufficient amount of the reactant material into the diamond powder during the HPHT process to provide a desired amount of the reaction product within the body, e.g., when the HPHT process is operated at elevated temperature conditions that are at or above the melting temperature of the reactant material.

Materials useful for forming the reactant material include those materials that are strong carbide formers to promote reaction with the ultra-hard material, e.g., when it is provided in the form of diamond. It is additionally desired that the reactant material not be a solvent metal catalyst material, such as those conventionally identified as Group VIII elements in the Periodic table. Thus, the ultra-hard body is substantially free of any such Group VIII element that may have been used to initially form the ultra-hard body. Additionally, it is desired that the reactant material be one that is capable, upon reacting with the diamond, of forming a reaction product having a coefficient of thermal expansion that is relatively closer to that of diamond than that of a solvent metal catalyst material.

Example reactant materials include B, Si, Ti, Mo, V, and combinations or alloys thereof. Suitable reactant materials can also include carbides of the above noted materials and their alloys. In an example embodiment, where the ultra-hard material is diamond, preferred reactant materials are Si and/or SiC. In the event that the Si reactant material is provided in the form of a preformed layer for infiltration during the HPHT process, the Si material can be provided in the form of a Si metal foil.

In one example embodiment, where Si is used as the reactant material, the Si can be provided in the form of nanocrystalline silicon powder that can be coated or otherwise disposed onto the surface of the diamond grains before HPHT processing. As used herein, the term "nanocrystalline" is understood to mean that the silicon powder has a nano-scale crystalline structure and is not amorphous.

During the HPHT process, the reactant material melts and reacts with the carbon in the diamond grains to form a reaction product that bonds the diamond grains together. When ultra-hard material is diamond and the reactant material used is Si, the HPHT operation is controlled to elevate the temperature and pressure of the contents within the HPHT device to a level sufficient to permit the melting of the Si, and sintering of the ultra-hard body by formation of the reaction product from the Si and diamond grains. In an example embodiment, the HPHT process is controlled to a pressure of approximately 5,500 MPa, and a temperature of from about 1150° C. to 1300° C. It is to be understood that the particular HPHT pressure and temperature conditions presented above are based on using a Si reactant material and a specific type and volume of diamond powder. Accordingly, pressures and/or temperatures other than those noted above may be useful for other types of reactant materials and/or other types and volumes of diamond powder.

During such HPHT processing, the reactant material melts and infiltrates into the diamond mixture, and reacts with the diamond grains to form silicon carbide (SiC), in the case where the reactant material is Si, between the diamond grains or crystals in the mixture. In such example embodiment, where Si is provided as the selected reactant material, it is desired that the HPHT process be held at the above noted temperature and pressure condition for a period of time of from about 2 to 20 minutes. This time period must be sufficient to melt all of the Si, allow the melted Si to infiltrate the diamond powder, and allow the infiltrated Si to react with the diamond to form the desired reaction product SiC, thereby bonding the diamond particles together. In an example embodiment, it is desired that substantially all of the Si reactant material be reacted, as Si is known to be brittle and residual unreacted Si in the diamond can have a deleterious effect on the final properties of the resulting ultra-hard composite construction. Thus, it is desired that the amount of Si that is provided be controlled so as to avoid excess silicone or large regions of unreacted silicon in the sintered product.

While particular HPHT processing pressures, temperatures and times have been provided, it is to be understood that one or more of these process variables may change depending on such factors as the type and amount of reactant material and/or diamond powder that is selected.

As noted above, when the reactant material is Si, it forms a reaction phase or product with the diamond grains, crystals or particles according to the reaction:

$$Si + C = SiC$$

This reaction between silicon and carbon present in the diamond grains, crystals or particles is desired as the reaction product; namely, silicon carbide is a ceramic material that has a coefficient of thermal expansion that is similar to diamond.

The reactant material operates to provide a thermally stable diamond bonded region through the formation of a reaction product that actually forms a bond between the diamond crystals. While a certain amount of diamond-to-diamond bonding can also occur within this diamond body, it is theorized that such direct diamond-to-diamond bonding represents a minority of the diamond bonding that occurs. In an example embodiment, where the reactant material is Si, it is believed that greater than about 75 percent, and more preferably 85 percent or more, of the diamond bonding occurring in the diamond body is provided by reaction of the diamond grains or particles with the reactant material.

While ideally, it is desired that all of the diamond bonding in the diamond body be provided by reaction with the reactant material, any amount of diamond-to-diamond bonding occurring in the body occurs without the presence or use of a solvent metal catalyst, thus the resulting diamond body is one having a degree of thermal stability that is superior to conventional PCD.

It is to be understood that the amount of the reactant material used during processing can and will vary depending on such factors as the size of the diamond grains that are used, the volume of diamond grains, the size and/or volume of the diamond body, the amount and/or type of the reactant material itself, in addition to the particular end-use application for the resulting ultra-hard composite construction.

The ultra-hard body can be constructed comprising having different diamond volume contents. For example, ultra-hard bodies of this invention can be configured having two or more regions that have different diamond volume contents, which different diamond volume contents can be provided in the form of a step change or in the form of a gradient change. Additionally, ultra-hard bodies of this invention can be configured having two or more regions with different average diamond grain sizes. The particular diamond content and/or diamond grain size that is used to form the ultra-hard body or different regions therein will vary depending on the particular end-use application.

Ultra-hard composite constructions of this invention can include a substrate attached to the ultra-hard body, e.g., if such is desired for purposes of facilitating attachment of the resulting construction to a desired wear and/or cutting device. In the case where the substrate is provided as the source of the reactant material, and is attached to the ultra-hard body during the HPHT process, it is desired that the substrate be provided in as a preformed member, and be formed from material that both includes the desired reactant material and that is capable of providing a desired degree of structural and/or mechanical properties for facilitating the desired attachment function. Alternatively, the substrate can be provided in the form of a green-state part that is not fully densified, or can be provided in the form of a powder mixture. In an embodiment where the ultra-hard material is diamond, it is desired that the substrate material not include a solvent metal catalyst material. Alternatively, the substrate may include a solvent metal catalyst material as long as such material has a melting temperature that is sufficiently higher than that of the reactant material so that it does not melt and infiltrate into the ultra-hard body during the HPHT process.

Example substrates useful as both a source of the reactant material and for providing a desired attachment member include ceramic materials, metallic materials, carbides, nitrides, carbonitrides, and cermets, that include one or more of the reactant materials described above.

Substrates useful for forming ultra-hard composite construction compacts of this invention, that are not also used as the source for the reactant material, can include those materials used as substrates for conventional PCD and thermally stable PCD constructions, e.g., cermets, carbides, nitrides, and the like. Such substrates can be attached to the ultra-hard body by HPHT process, or by other techniques such as by brazing, welding, microwave sintering, or the like. In the event that the substrate includes a solvent metal catalyst material, it may be desired to attach the substrate to the ultra-hard body by brazing or other such technique, or use an intermediate material between the diamond body and the substrate for attachment by HPHT process to prevent any unwanted migration of the solvent metal catalyst material into the diamond body.

Figure 2A:
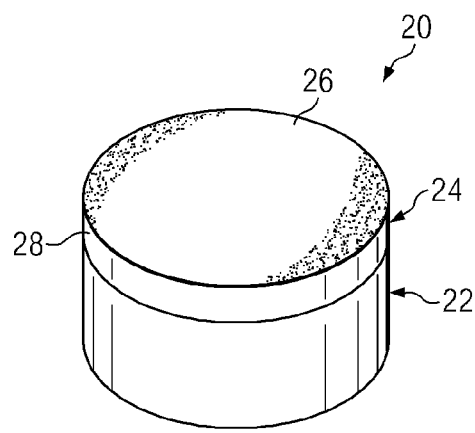
FIG. 2A is a perspective view of a first embodiment ultra-hard composite construction of this invention.
Figure 2B:
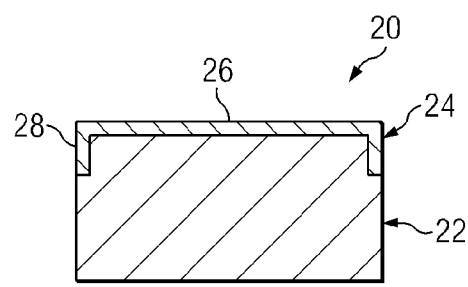
FIG. 2B is a cross-section view of the first embodiment ultra-hard composite construction of FIG. 2A.

FIGS. 2A and 2B illustrate a first embodiment ultra-hard composite construction 20 of this invention. Generally speaking, such construction 20 comprises an ultra-hard body 22, e.g., formed from the diamond material described above. The diamond body can be provided having a number of different shapes and sizes, and in the example embodiment is provided in the form of a disc-shaped body having a given diameter and a given thickness. While the ultra-hard composite construction is illustrated as having a certain configuration, it is to be understood that ultra-hard composite constructions of this invention can be configured having a variety of different shapes and sizes depending on the particular end-use wear and/or cutting application.

A feature of ultra-hard composite constructions of this invention is that the ultra-hard body 22 includes a region 24 that has a high diamond density. In an example embodiment, this region 24 is positioned on the body to form a surface portion of the construction that may or may not be a working surface. In the example embodiment illustrated in FIGS. 2A and 2B, the region 24 is positioned along the body to form a top surface or table 26 of the construction, and extends downwardly therefrom along at least a portion of a sidewall surface 28 of the construction, e.g., at least a thickness of the region 24. It is to be understood that the region 24 can be positioned to cover surfaces and/or combinations of surfaces of the body other than that illustrated or described. For example, the region can be positioned adjacent all or a portion/segment of the body top surface 26 without extending along the sidewall surface 28. Alternatively, the region can be position adjacent all or a portion/segment of the body sidewall surface 38 without extending along the body top surface 26. Where sidewall coverage is desired, the extent of such sidewall coverage can vary from as little as about 10 percent of the total body sidewall length, to along the entire length of the sidewall.

Additionally, while a region 24 having a particular configuration has been illustrated in FIGS. 2A and 2B, e.g., having a 90 degree angle between the top and sidewall surfaces, it is to be understood the transition between the top and sidewall surfaces can be beveled, and that the region 24 can extend along such beveled portion.

The region 24 is formed from a high-density diamond material, e.g., that is formed substantially exclusively from diamond and that may have only impurity amounts of other materials. In defining the actual volume density of this region 24 one must take into account any voids or empty pores that may exist therein. Accordingly, with this understanding, in an example embodiment the high-density diamond region 24 having a diamond density of from about 95 to 99 percent, and possibly greater than 99 percent by volume. The high-diamond density material can be multi, poly, or single-crystalline. Such high-diamond density material is inherently thermally stable and includes minimal or no open interstitial spaces, voids or regions between the diamond bonded crystals common to conventional PCD, i.e., it is essentially pure carbon with no binder phase.

The diamond crystals used to form the high-density diamond region can be configured having a variety of different shapes depending on such factors as the process and type of diamond that is used to form such region. For example, as described below, the diamond crystals in this region can be configured having a columnar structure when the diamond is provided as a material made by chemical vapor deposition (CVD) process, forming what is known as CVD diamond.

Methods useful for forming the high-density diamond region can include any process that is known to create a volume of bonded-together diamond crystals that is essentially free of interstitial regions or any other second phase material. Methods known to provide such a desired volume of diamond-bonded crystals, with a diamond volume density or content of essentially 100 percent, include chemical vapor deposition (CVD) and plasma vapor deposition (PVD). The CVD or PVD methods useful for producing the high-density diamond region include those known in the art for otherwise producing layers or regions of exclusively bonded diamond crystals. Such methods generally involve a crystal growth process, whereby solid diamond bonded material is formed from a gas or plasma phase using a reactive gas mixture that supplies the necessary active species, i.e., carbon, onto a controlled surface. A desired characteristic of such diamond material provided by using CVD or PVD process is that it have a very high purity level and does not include any binder agent or other second phase that could otherwise adversely impact thermal stability of the bonded diamond crystals. In an example embodiment, a desired thickness of the high-density diamond region is grown onto the underlying ultra-hard body using one of these techniques.

In an example embodiment, the high density diamond region is formed using a CVD or PVD process to provide a material microstructure comprising a plurality of diamond bonded crystals having an average particle size in the range of from about 0.01 to 2,000 micrometers, and preferably in the range of from about 1 to 1,000 micrometers, and more preferably in the range of from about 5 to 300 micrometers. A high-density diamond region comprising bonded-together diamond crystals within the above particle size range provides desired properties of wear resistance and hardness that are especially well suited for aggressive wear and/or cutting applications such as for use with subterranean drill bits. However, it is to be understood that the particular particle size of the diamond crystals used to form the high-density diamond region can and will vary depending on such factors as the thickness of the high-density diamond region, and the particular end-use application.

Alternatively, rather than being grown onto the underlying ultra-hard body, the high-density diamond region can be grown separately from the ultra-hard body as its own independent body or layer that is subsequently joined to the ultra-hard body by an appropriate attachment technique, such as by a further HPHT process.

As best illustrated in FIG. 2B, in an example embodiment, the underlying ultra-hard body 22 is provided having a desired configuration to accommodate the desired configuration and/or thickness of the region 24. In the example embodiment illustrated, the underlying ultra-hard body 22 is finished by conventional technique, e.g., by OD grinding and/or polishing, to a desired dimension and/or configuration, to accommodate placement of a portion of the region along a sidewall surface of the body.

In an example embodiment, where the high-density diamond region defines both a top surface and at least a portion of the sidewall surface of the construction, the underlying body is configured such that the thickness of the region, as measured perpendicular to its outside surface, has substantially the same or a uniform thickness, e.g., the thickness of the region positioned along the top surface is substantially the same as the thickness of the region positioned along the sidewall surface. If desired, the thickness of the region along different portions of the body can be different.

The thickness of the high-density diamond region can and will vary depending on a number of factors that include the type of materials used to form the ultra-body, the configuration of the ultra-hard body, and the particular end-use application for the construction. In an example embodiment, the high-density diamond region has a thickness of less than about 100 micrometers, preferably less than about 50 micrometers, and more preferably less than about 20 micrometers. In a particular embodiment, the high-density diamond region can have a thickness in the range of from about 5 to 80 micrometers.

As noted above, the high-density diamond region can have a thickness at one location that is different that at another location, e.g., the thickness of the high-density region along the top of the ultra-hard body can be different that that of the region along the side of the ultra-hard body. Alternatively, the ultra-hard region can be provided such that its thickness changes as a function of position along the same portion of the underlying ultra-hard body, e.g., the region has a different thickness at different locations of the ultra-hard body top surface, and/or has a different thickness at different locations of the ultra-hard body side surface. For example, the construction can be configured with the high-density diamond region positioned along a top surface of the ultra-hard body, and having an increased thickness at or near the edge of the top surface when compared to other locations on the top surface. Accordingly, it is to be understood that the particular thickness of the high-density diamond region can be constant or change as a function of position on the construction as called for by the particular end-use application.

Figure 3A:
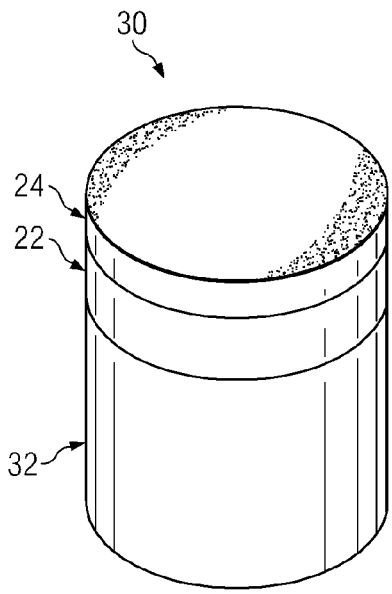
FIG. 3A is a perspective view of a second embodiment ultra-hard composite construction of this invention.
Figure 3B:
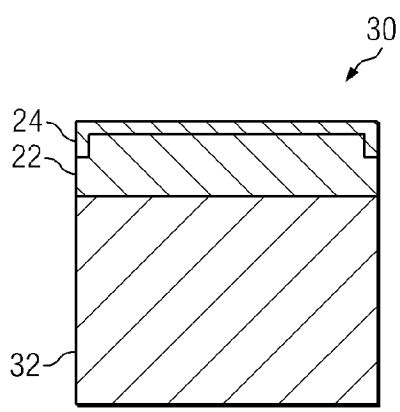
FIG. 3B is a cross-section view of the second embodiment ultra-hard composite construction of FIG. 3A.

FIGS. 3A and 3B illustrate a second embodiment ultra-hard composite construction 30 of this invention that is somewhat similar to that described above and illustrated in FIGS. 2A and 2B, comprising a ultra-hard body 22 with a high-diamond density region 24 positioned to form one or more surface portions of the constructions. However, this second embodiment ultra-hard composite construction is configured in the form of a compact further comprising a substrate 32 attached to the ultra-hard body 22. As noted above, the substrate can be provided as both a source of the reactant material for forming the ultra-hard body and as a member for attaching the construction to an end-used wear and/or cutting device, or can be provided only to facilitate attachment. In this particular embodiments the substrate 32 is joined directly to the body 22.

Ultra-hard composite constructions of this invention may have an ultra-hard body and substrate thickness that can and will vary depending on the particular end-use application. In an example embodiment, when the ultra-hard composite construction is provided in the form of a compact configured as a shear cutter for use with a subterranean drill bit, the ultra-hard composite construction may comprise an ultra-hard body having a thickness of at least about 50 micrometers. In an example embodiment, the thickness of the ultra-hard body can be in the range of from about 0.1 mm to 5 mm, and preferably in the range of from about 1 mm to 3 mm micrometers.

The ultra-hard composite construction may have a substrate thickness in the range of from about 1 mm to 20 mm, preferably in the range of from about 10 mm to 18 mm, and more preferably in the range of from about 13 mm to 16 mm. Again, it is to be understood that the exact thickness of the ultra-hard body and substrate will vary depending on the end-use application.

Figure 4A:
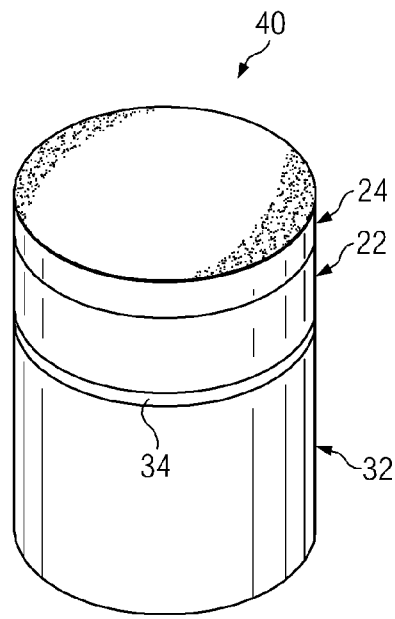
FIG. 4A is a perspective view of a third embodiment ultra-hard composite construction of this invention.
Figure 4B:
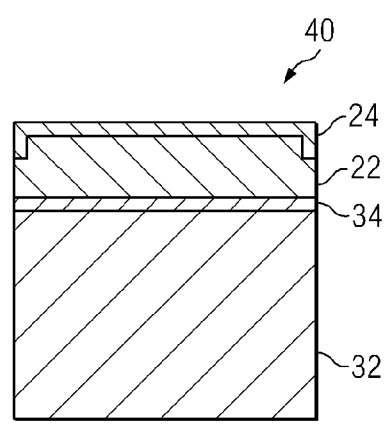
FIG. 4B is a cross-section view of the third embodiment ultra-hard composite construction of FIG. 4A.

FIGS. 4A and 4B illustrate a third embodiment ultra-hard composite construction 40 of this invention that is somewhat similar to that described above and illustrated in FIGS. 3A and 3B, comprising a ultra-hard body 22 with a high-diamond density region 24 positioned adjacent one or more body surface, and comprising a substrate 32. However, this third embodiment ultra-hard composite construction comprises an intermediate or intervening layer 34 interposed between the substrate 32 and the body 22. The intermediate layer 34 can be used to promote a desired attachment bond between the body and substrate, and/or can be used to prevent the migration of any unwanted solvent metal catalyst from the substrate into the ultra-hard body, e.g., during attachment of the substrate.

In either case, the intermediate layer can be formed from materials such as braze alloys, refractory metals, ceramics, cermets and combinations thereof that are capable of forming a desired attachment bond between the body and the substrate by braze process or elevated temperature and pressure process. In a preferred embodiment where substrate is being attached by an elevated temperature process, it is desired that the intermediate layer be substantially free of solvent metal catalyst materials identified as Group VIII elements in the Periodic table when the elevated temperature meets or exceeds the melting temperature of any such Group VIII element.

Figure 5:
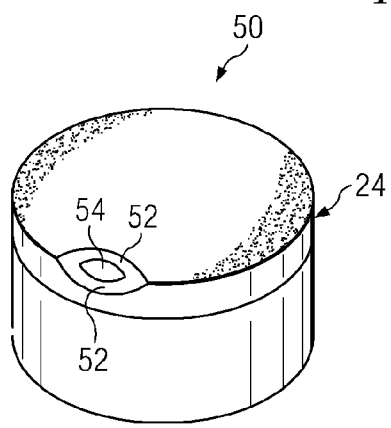
FIG. 5 is a perspective view of the an ultra-hard composite construction of this invention comprising the formation of one or more lips.

FIG. 5 illustrates an ultra-hard composite construction of this invention 50 displaying the formation of one or more lips or exposed edges 52 that have been formed in the high-density diamond region 24. The lips or edges 42 are formed from a removed section of the high-density diamond region of sufficient depth. In an example embodiment, the removed section can be provided by machining process during manufacturing or by wear that occurs during operation of the wear and/or cutting device that the construction is attached to. The depth of the removed section can extend to expose an underlying portion of the ultra-hard body, in which case the thickness of the lips or edges is approximately the same as the thickness of the high-density diamond region at that location. The presence of the lips can operate to form a cutting edge that facilitates use of the construction in a cutting operation. The exact placement, size, shape, and number of lips existing in ultra-hard composite constructions of this invention are understood to vary depending on the particular configuration and placement position of the region 24. For example, the region can be machined or worn away to provide a single or multiple lips.

Ultra-hard composite constructions and compacts of this invention can be used in a number of different applications, such as tools for mining, cutting, machining and construction applications, where the combined properties of thermal stability, and wear and abrasion resistance are highly desired Ultra-hard composite constructions and compacts of this invention are particularly well suited for forming working, wear and/or cutting components in machine tools and drill and mining bits such as roller cone rock bits, percussion or hammer bits, diamond bits, and shear cutters.

FIG. 6 illustrates an embodiment of a ultra-hard composite construction compact of this invention provided in the form of an insert 60 used in a wear or cutting application in a roller cone drill bit or percussion or hammer drill bit. For example, such inserts can be formed from blanks comprising a substrate portion 62 formed from one or more of the substrate materials disclosed above, and an ultra-hard body 64 having a high diamond density region 66 positioned along all or part of a working surface. The blanks are pressed or machined to the desired shape of a roller cone rock bit insert.

FIG. 7 illustrates a rotary or roller cone drill bit in the form of a rock bit 70 comprising a number of the wear or cutting inserts 60 disclosed above and illustrated in FIG. 6. The rock bit 70 comprises a body 72 having three legs 74, and a roller cutter cone 76 mounted on a lower end of each leg. The inserts 60 can be fabricated according to the method described above, and are provided along the surfaces of each cutter cone 76 for bearing on a rock formation being drilled. In an example embodiment, the inserts are positioned along a gage row on the cone, but can also be positioned along the heel row.

FIG. 8 illustrates the inserts described above as used with a percussion or hammer bit 80. The hammer bit comprises a hollow steel body 82 having a threaded pin 84 on an end of the body for assembling the bit onto a drill string (not shown) for drilling oil wells and the like. A plurality of the inserts 60 is provided in the surface of a head 86 of the body 82 for bearing on the subterranean formation being drilled.

Figure 9:
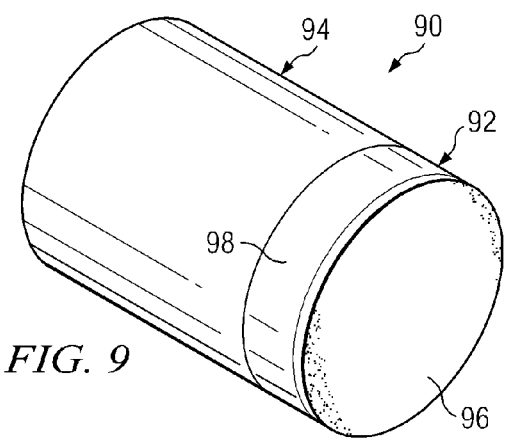
FIG. 9 is a perspective side view of a shear cutter comprising the ultra-hard composite construction of this invention.

FIG. 9 illustrates an ultra-hard composite construction compact of this invention as embodied in the form of a shear cutter 90 used, for example, with a drag bit for drilling subterranean formations. The shear cutter 90 comprises an ultra-hard body 92 that is attached to a cutter substrate 94. The ultra-hard body 92 includes a high-density diamond region 98 that forms at least part of a working or cutting surface 96 of the cutter. It is to be understood that FIG. 9 illustrates a single embodiment of a shear cutter having a particular configuration, and that shear cutters that are configured differently are intended to be within the scope of this invention.

Figure 10:
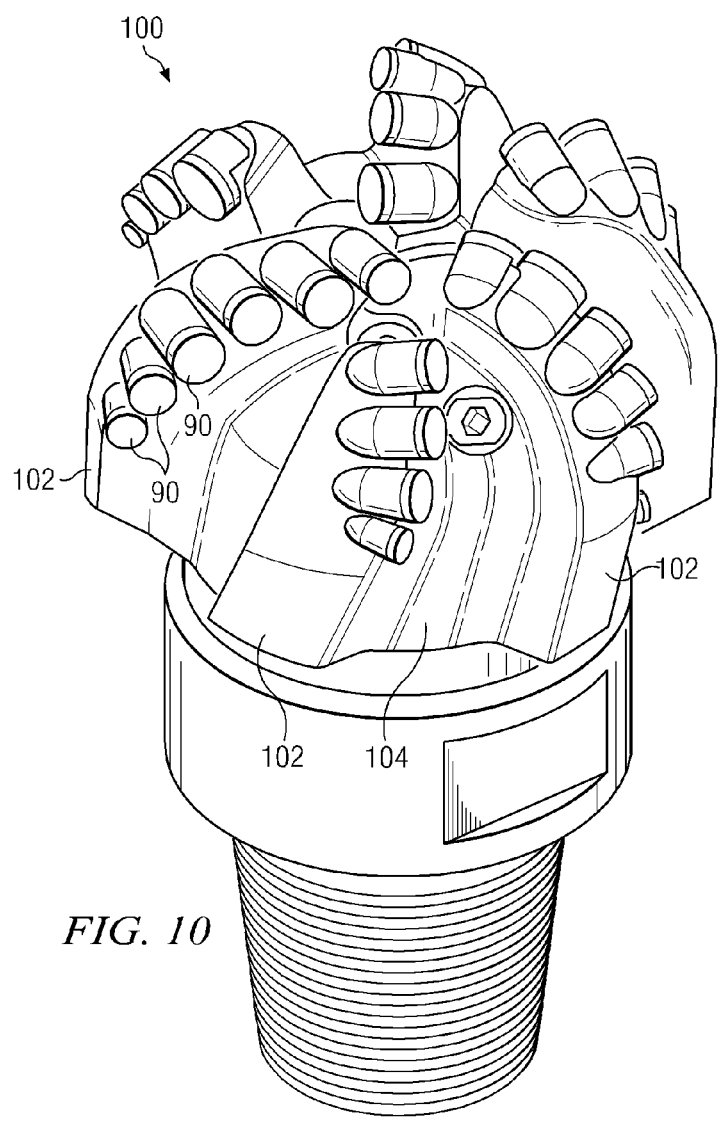
FIG. 10 is a perspective side view of a drag bit comprising a number of the shear cutters of FIG. 9.

FIG. 10 illustrates a drag bit 100 comprising a plurality of the shear cutters 90 described above and illustrated in FIG. 9. The shear cutters are each attached to blades 102 that extend from a body or head 104 of the drag bit for cutting against the subterranean formation being drilled.

Other modifications and variations of diamond bonded bodies comprising a ultra-hard composite constructions and compacts formed therefrom will be apparent to those skilled in the art. For example, while embodiments of constructions and compacts of this invention have been described as illustrated as comprising planar interfacing surfaces between adjacent regions, e.g., between the ultra-hard body and the high-density diamond material, and between the ultra-hard body and a substrate, it is to be understood that these interfacing surfaces can be configured having a nonplanar configuration that can assist in improving an improved attachment therebetween. It is, therefore, to be understood that within the scope of the appended claims, this invention may be practiced otherwise than as specifically described.

What is claimed is:

1. A bit for drilling subterranean formations comprising a body and a number of cutting elements attached to the body, wherein one or more of the cutting elements comprises an ultra-hard composite construction comprising:
   an ultra-hard body comprising a plurality of diamond crystals, wherein the ultra-hard body comprises a first region comprising a majority of the diamond crystals bonded to one another via a reaction product that is interposed therebetween and that is formed by reaction of the diamond crystals with a reactant material;
   a high-density diamond region that is positioned along at least a portion of the ultra-hard body surface and is immediately adjacent the portion of the ultra-hard body, wherein the high-density diamond region is substantially exclusively diamond, is substantially free of the reaction product, and is formed without a second phase material; and
   a substrate that is attached to the ultra-hard body.

2. The bit as recited in claim 1 wherein the high-density diamond region has a diamond volume content of from about 95 to 99 percent.

3. The bit as recited in claim 2 wherein the first region has a diamond volume content in the range of from 75 to 90 percent.

4. The bit as recited in claim 1 wherein the reactant material is selected from the group of materials that form a carbide reaction product when reacted with diamond.

5. The bit as recited in claim 1 wherein the reactant material is selected from the group consisting of B, Si, Ti, Mo, V, carbides thereof, and combinations thereof 6. The bit as recited in claim 1 wherein the ultra-hard body and the high-density diamond region is substantially free of a solvent metal catalyst material selected from the Group VIII elements of the Periodic table.

7. The bit as recited in claim 1 wherein the reactant material is selected from the group of materials that form a reaction product having a coefficient of thermal expansion that is closer to diamond than that of a solvent metal catalyst selected from Group VIII elements of the Periodic table.

8. The bit as recited in claim 1 wherein greater than about 75 percent by volume of the diamond crystals are bonded to one another by the reaction product.

9. The bit as recited in claim 1 wherein greater than about 85 percent by volume of the diamond crystals are bonded to one another by the reaction product.

10. The bit as recited in claim 1 wherein the ultra-hard body comprises a diamond volume content in one region that is different from that of another region.

11. The bit as recited in claim 1 wherein the high-density diamond region contains only impurity amounts of non-diamond materials.

12. The bit as recited in claim 1 wherein the high-density diamond region has a thickness of about 20 micrometers or less.

13. The bit as recited in claim 1 wherein the high-density diamond region extends along a surface portion of the body forming a working surface.

14. The bit as recited in claim 13 wherein working surface is positioned along one or both of a top or sidewall surface of the body.

15. The bit as recited in claim 13 wherein the working surface is positioned along at least a portion of a top surface and at least a portion of a sidewall surface of the body.

16. The bit as recited in claim 1 wherein the high-density diamond region has a different thickness at one location on the construction than at another location on the construction.

17. The bit as recited in claim 1 wherein the substrate comprises a material selected from the group consisting of metallic materials, ceramic materials, carbides, nitrides, cermets, and mixtures thereof.

18. The bit as recited in claim 17 wherein the substrate is substantially free of a solvent metal catalyst selected from Group VIII elements of the Periodic table.

19. The bit as recited in claim 1 further comprising an intermediate layer interposed between the ultra-hard body and the substrate.

20. The bit as recited in claim 1 further comprising one or more lips that formed in the high-density diamond region and that define edge surfaces of the high-density diamond region.

21. The bit as recited in claim 1 further comprising a number of legs extending from the bit body and cones that are rotabably attached to a respective leg, wherein the one or more cutting elements are attached to one or more of the cones.

22. The bit as recited in claim 1 further comprising one or more blades projecting outwardly from the bit body, wherein the one or more cutting elements are attached to one or more of the blades.

23. The bit as recited in claim 1 wherein the high-density diamond region has no interstitial spaces.

24. The bit as recited in claim 1 wherein the high-density diamond region has a thickness of less than about 100 micrometers.

25. The bit as recited in claim 1 wherein the high-density diamond region has a thickness of less than about 50 micrometers.

26. An ultra-hard composite construction comprising:
  an ultra-hard body comprising a plurality of diamond crystals, wherein the ultra-hard body comprises a first region comprising a majority of the diamond crystals bonded to one another via a SiC reaction product that is interposed therebetween, wherein the SiC reaction product has a thermal expansion characteristic that is more closely matched to the diamond crystals than the thermal expansion characteristic of a Group VIII element;
  a high-density diamond region that is disposed onto and immediately adjacent a surface of the body, wherein the high-density diamond is substantially exclusively diamond; is substantially free of the reaction product, and is formed without a second phase material; and has a diamond volume content of from about 95 to 99 percent, wherein the first region of the ultra-hard body and the high-density diamond region are both substantially free of a catalyst material selected from Group VIII of the Periodic table; and
  a substrate that is attached to the ultra-hard body, wherein the substrate is selected from the group of material consisting of metallic materials, ceramic materials, carbides, nitrides, cermets, and mixtures thereof 27. The composite construction as recited in claim 26 wherein the reaction product is formed using nanocrystalline silicon.

28. The composite construction as recited in claim 26 wherein the high-density diamond region is positioned along at least a portion of a top surface and at least a portion of a sidewall surface of the body.

29. The composite construction as recited in claim 28 wherein the ultra hard body has a diamond volume content in the range of from 75 to 90 percent.

30. A method for making an ultra-hard composite construction comprising the steps of:
  forming a diamond body by combining together diamond grains and exposing the diamond grains to elevated temperature and pressure conditions in the presence of a reactant material to produce a reaction product, wherein a majority of the diamond grains are bonded to one another via the reaction product;
  applying a high-density diamond region onto and immediately adjacent at least a portion of the diamond body, wherein high-density diamond region consists substantially exclusively of diamond, is substantially free of the reaction product, and is formed without a second phase material; and
  attaching a substrate to the diamond body.

31. The method as recited in claim 30 wherein during the step of applying, the high-density diamond region has a diamond volume content of from about 95 to 99 percent.

32. The method as recited in claim 30 wherein during the process of forming, the diamond body is substantially free of Group VIII elements of the Periodic table.

33. The method as recited in claim 30 wherein during the process of forming, greater than about 75 percent of the diamond grains are bonded to one another by the reaction product.

34. The method as recited in claim 30 wherein the process of forming takes place at a pressure of about 5,000 MPa or greater, and at a temperature that is at or above the melting temperature of the reactant material.

35. The method as recited in claim 30 wherein the process of applying involves growing one or more diamond crystals onto the diamond body.

36. The method as recited in claim 30 wherein during the process of applying, the high-density diamond region is positioned to form at least a portion of a working surface of the construction.

37. The method as recited in claim 30, wherein the substrate comprises a material selected from the group consisting of metallic materials, ceramic materials, carbides, nitrides, cermets, and mixtures thereof.

38. The method as recited in claim 37 wherein the substrate is substantially free of a catalyst material selected from Group VIII of the Periodic table.

39. The method as recited in claim 30 wherein the reactant material comprises nanocrystalline silicone powder.

\* \* \* \* \*